(12) United States Patent
Ishii

(10) Patent No.: US 7,643,723 B2
(45) Date of Patent: Jan. 5, 2010

(54) IMAGE PROCESSING APPARATUS AND IMAGE PROCESSING METHOD

(75) Inventor: Yoshiki Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1227 days.

(21) Appl. No.: 10/176,033

(22) Filed: Jun. 21, 2002

(65) Prior Publication Data
US 2003/0016947 A1    Jan. 23, 2003

(30) Foreign Application Priority Data
Jul. 18, 2001    (JP)    ............................. 2001-218055

(51) Int. Cl.
*G11B 27/00* (2006.01)

(52) U.S. Cl. ............................. 386/52; 386/55; 386/64; 715/723; 715/724; 715/725

(58) Field of Classification Search .................. 386/52, 386/55, 64; 715/723, 724, 725
See application file for complete search history.

(56) References Cited

U.S. PATENT DOCUMENTS

| 4,953,019 A | 8/1990 | Skikakura et al. ........... 358/133 |
| 7,020,381 B1* | 3/2006 | Kato et al. .................... 386/52 |
| 2001/0004417 A1* | 6/2001 | Narutoshi et al. ............. 386/52 |

* cited by examiner

*Primary Examiner*—Marsha D. Banks-Harold
*Assistant Examiner*—Daniel Tekle
(74) *Attorney, Agent, or Firm*—Fitzpatrick, Cella, Harper & Scinto

(57) ABSTRACT

In an image processing apparatus, when a plurality of items of moving-image data, modified data obtained by modifying the plurality of items of moving-image data, and presentation-description data which indicates the presentation order of the plurality of items of moving-image data and the modified data, are processed, an editing screen formed of representative images of moving-image data for which presentation is specified in the presentation-description data, and of a representative image of the modified data is generated according to the presentation-description data, and the representative images of the moving-image data and the representative image of the modified data can be distinguished from each other.

15 Claims, 11 Drawing Sheets

```
<video src = "mov1.mpg"/>
<video src = "mov2.mpg"clipEnd = "9s"tailShift = "1s"/>
<video src = "mov3.mpg"rclipFor = "transition"/>
<video src = "mov4.mpg"clipBegin = "1s"headShift"1"/>
<video src = "mov5.mpg"/>
```

```
<video src = "mov1.mpg"/>
<video src = "mov2.mpg"clipEnd = "9s"tailShift = "1s"/>
<video src = "mov3.mpg"rclipFor = "wipe_LR"/>
<video src = "mov4.mpg"clipBegin = "1s"headShift = "1s"/>
<video src = "mov5.mpg"/>
```

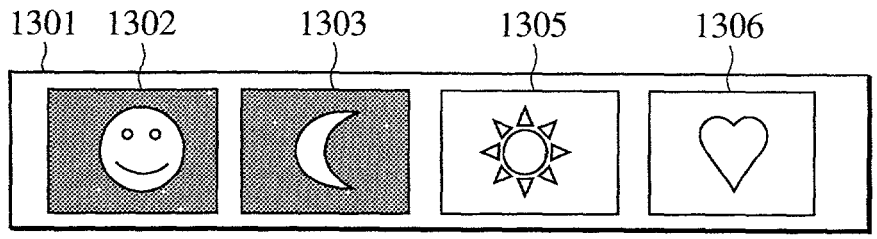
FIG. 13
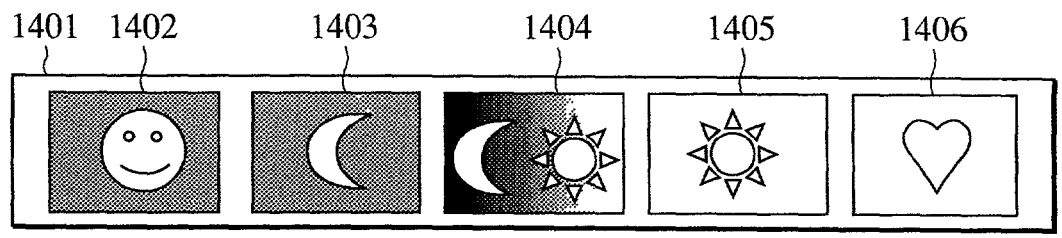
FIG. 14
```
<smil>
 <head>
 ...
 </head>
 <body>
  <video src = "mov1.mpg"/>
  <video src = "mov2.mpg"/>
  <video src = "mov3.mpg"/>
  <video src = "mov4.mpg"/>
  <video src = "mov5.mpg"/>
 </body>
</smil>
```
FIG. 15

IMAGE PROCESSING APPARATUS AND IMAGE PROCESSING METHOD

BACKGROUND OF THE INVENTION

1. Field of the Invention

The present invention relates to image processing apparatuses and image processing methods, and more particularly, to processing of presentation-description data used for controlling the presentation of image data.

2. Description of the Related Art

Units for handling digital moving-image data, such as digital video recorders and DVD players, are wide spread nowadays, and such moving-image data has been edited not only in studios but also in homes as audio-visual equipment and computer equipment have become more advanced.

In general moving-image editing, a part of a body of moving-image data serving as material for editing is cut out and rearranged, and various video effects are applied. As the performance of playback units has been improved, there is now a system in which the playback sequence of moving-image data is described by the use of a presentation-description language (script), such as a synchronized multimedia integration language (SMIL), and a playback unit performs playback according to the description data.

FIG. 15 shows an excerpt of presentation-description data written with SMIL 2.0. In this example, mov1.mpg to mov5.mpg data is sequentially played back.

Since script editing allows cuts to be rearranged when moving image is edited by the use of such a presentation-description data, the cost of an editing machine and time required for editing can be largely reduced. Depending on a language specification, a video effect can be applied during playback. In addition, a desired effect can be applied when control is applied such that moving-image data is created only for a portion where the effect is applied, during editing, and this moving-image data is inserted into a larger body of moving-image data serving as material for editing, by the use of presentation-description data, and played back.

Let it be assumed in FIG. 15 that mov3.mpg has moving-image data of only a portion where a wipe effect has been applied, from a time one second before the end of mov2.mpg to a time one second after the start of mov4.mpg. When such moving-image data to which an effect has been applied is used, since the presentation-description data merely indicates a usual or standard cut, editing can be performed with effect, irrespective of playback units.

There has been known an editing-screen style called a storyboard, as a user interface for editing in moving-image editing for consumers. FIG. 14 shows a storyboard which illustrates mov1.mpg to mov5.mpg shown in FIG. 15. In a storyboard, thumbnail images representing moving-image clips are displayed, and the user rearranges thumbnails which indicate moving-image cuts, on the storyboard, to execute moving-image editing.

Even when (as in the example described above) mov3.mpg has moving-image data of only a portion where a wipe effect has been applied from a time one second before the end of mov2.mpg to a time one second after the start of mov4.mpg, since presentation-description data used in a conventional system does not have information indicating that mov3.mpg corresponds to a portion where the wipe effect has been applied, the thumbnail image indicated by 1404 in FIG. 14 is shown on the storyboard as a usual video clip (i.e., one which does not reflect the wipe).

Therefore, the user cannot easily perceive that the clip corresponding to thumbnail 1404 is one where the wipe (or other specified) effect has been applied, and editing such as to change the type of an effect, is difficult.

SUMMARY OF THE INVENTION

It is an object of the present invention to solve the foregoing problem.

Another object of the present invention is to allow modified data to be easily recognized when image data is processed with the use of presentation-description data.

One of the foregoing objects is achieved in one aspect of the present invention through the provision of an image processing apparatus for processing a plurality of items of moving-image data, modified data obtained by modifying the plurality of items of moving-image data, and presentation-description data which indicates the presentation order of the plurality of items of moving-image data and the modified data. The apparatus comprises detection means for detecting a modified-data object which specifies the presentation of the modified data, among the presentation-description data, and representative-image generation means for generating usual representative-image data for moving-image data for which presentation is specified in the presentation-description data, and modified representative-image data for the modified data, Editing-screen generation means are provided for generating editing-screen data formed of the usual representative-image data and the modified representative-image data according to the output of the detection means, as are display control means, for displaying an editing screen based on the editing-screen data generated by the editing-screen generation means, on display means.

One of the foregoing objects is achieved in another aspect of the present invention through the provision of an image processing apparatus for processing a plurality of items of moving-image data, modified data obtained by modifying the plurality of items of moving-image data, and presentation-description data which indicates the presentation order of the plurality of items of moving-image data and the modified data. This apparatus comprises editing-screen generation means for generating an editing screen formed of representative images of moving-image data for which presentation is specified in the presentation-description data, according to the presentation-description data, and control means for detecting a modified-data object which specifies the presentation of the modified data, among the presentation-description data, and for controlling the editing-screen generation means so as to disable the display of a representative image of the modified data specified by the modified-data object.

One of the foregoing objects is achieved in yet another aspect of the present invention through the provision of an image processing apparatus for processing a plurality of items of moving-image data, modified data obtained by modifying the plurality of items of moving-image data, and presentation-description data which indicates the presentation order of the plurality of items of moving-image data and the modified data. This apparatus includes editing-screen generation means, which generate an editing screen formed of representative images of moving-image data for which presentation is specified in the presentation-description data, and of a representative image of the modified data, according to the presentation-description data such that the representative images of the moving-image data and the representative image of the modified data can be distinguished from each other.

One of the foregoing objects is achieved in yet still another aspect of the present invention through the provision of an image processing method for processing a plurality of items of moving-image data, modified data obtained by modifying the plurality of items of moving-image data, and presentation-description data which indicates the presentation order of the plurality of items of moving-image data and the modified data. This method includes detecting a modified-data object which specifies the presentation of the modified data, among the presentation-description data, generating usual representative-image data for moving-image data for which presentation is specified in the presentation-description data, and modified representative-image data for the modified data, and generating editing-screen data formed of the usual representative-image data and the modified representative-image data according to the output of the detection step. The method also includes a display control step, of displaying an editing screen based on the editing-screen data, on display means.

One of the foregoing objects is achieved in a further aspect of the present invention through the provision of an image processing method for processing a plurality of items of moving-image data, modified data obtained by modifying the plurality of items of moving-image data, and presentation-description data which indicates the presentation order of the plurality of items of moving-image data and the modified data. This method includes generating an editing screen formed of representative images of moving-image data for which presentation is specified in the presentation-description data, according to the presentation-description data, and a control step of detecting a modified-data object which specifies the presentation of the modified data, among the presentation-description data, and of controlling the editing-screen generation step so as to disable the display of a representative image of the modified data specified by the modified-data object.

One of the foregoing objects is achieved in a yet further aspect of the present invention through the provision of an image processing method for processing a plurality of items of moving-image data, modified data obtained by modifying the plurality of items of moving-image data, and presentation-description data which indicates the presentation order of the plurality of items of moving-image data and the modified data. This method includes generation of an editing screen formed of representative images of moving-image data for which presentation is specified in the presentation-description data, and of a representative image of the modified data, according to the presentation-description data, and the representative images of the moving-image data and the representative image of the modified data can be distinguished from each other.

Further objects, features and advantages of the present invention will become apparent from the following description of the preferred embodiments (with reference to the attached drawings).

BRIEF DESCRIPTION OF THE DRAWINGS

FIG. 13 is a view showing still yet another storyboard display screen.

FIG. 14 is a view showing a conventional storyboard display screen.

FIG. 15 is a view showing conventional example presentation-description data.

DESCRIPTION OF THE PREFERRED EMBODIMENTS

Figure 1:
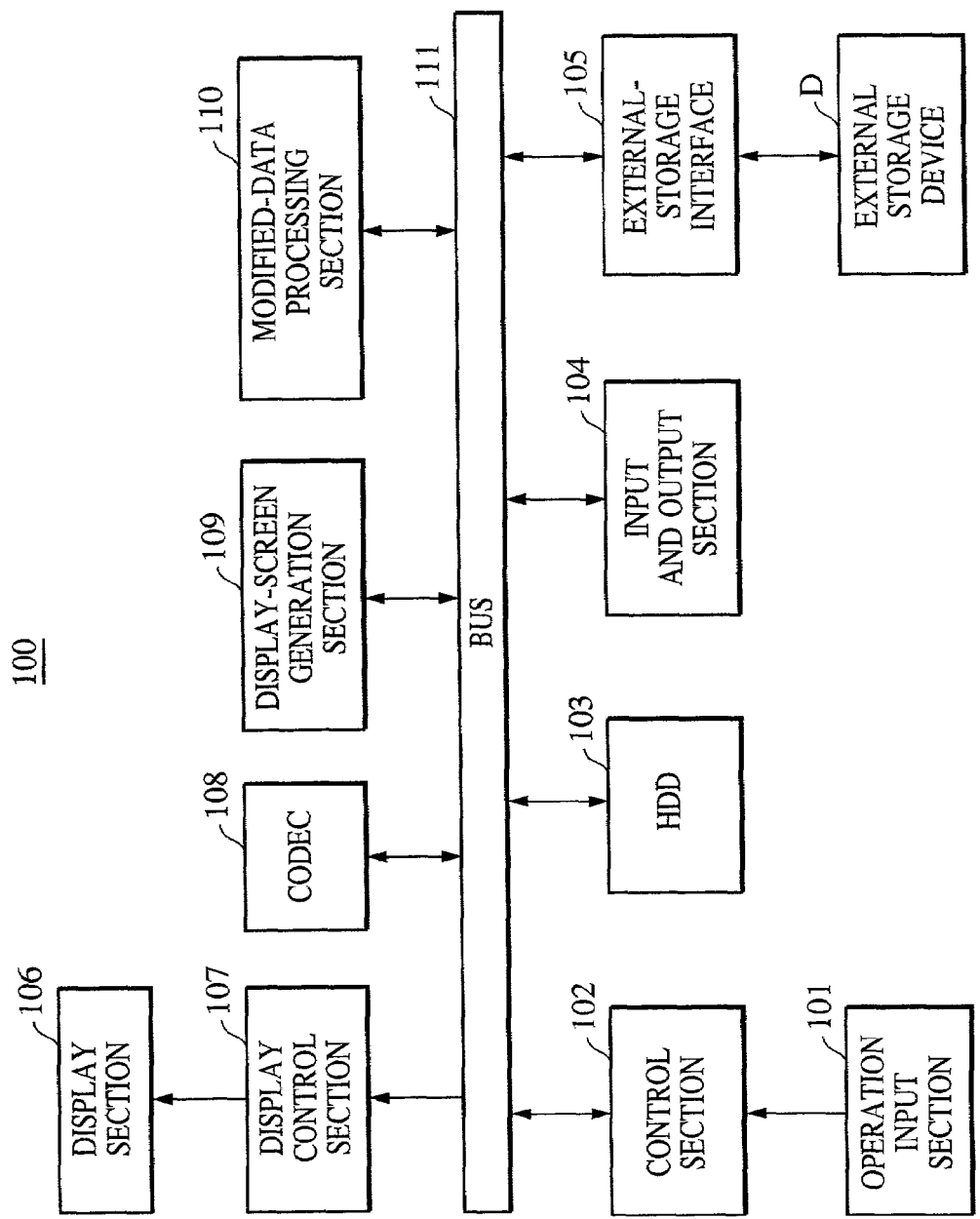
FIG. 1 is a block diagram of an editing apparatus according to an embodiment of the present invention.

Embodiments of the present invention will be described below by referring to the drawings.

FIG. 1 is a block diagram of an editing apparatus 100 according to an embodiment of the present invention.

In FIG. 1, the editing apparatus 100 includes an operation input section 101, such as a remote controller, a mouse, or a keyboard; a control section 102 for controlling the operation of the editing apparatus 100 according to an instruction sent from the operation input section 101; a hard disk drive (HDD) 103 for storing data handled by the editing apparatus 100, such as image data, audio data, and presentation-description data; an input and output section 104 for inputting and outputting data to and from an external unit, the section 104 including an IEEE-1394 interface or a USB interface; and an external-storage interface 105 for inputting and outputting data to and from an external storage device D, such as a disk medium, including a CD-ROM, a DVD-ROM, or a DVD-RAM, and a memory card.

The editing apparatus 100 also includes a display section 106, such as a CRT or a liquid-crystal display; a display control section 107 for controlling the display operation of the display section 106; a CODEC 108 for encoding and decoding image data and audio data; a display-screen generation section 109 for generating storyboard-type display screens, as described later; a modified-data processing section 110 for processing presentation-description data and modified data according to a user's editing operation; and a data bus 111 for transferring data among the sections of the editing apparatus 100.

The editing apparatus 100 can use presentation-description data to edit data stored in the HDD 103. Editing in the editing apparatus 100 will be described below with display-screen control being focused on.

When the operation input section 101 sends an instruction for displaying a storyboard according to presentation-description data, the control section 102 controls the HDD 103 so that presentation-description data stored in the HDD 103 is read and output to the display-screen generation section 109.

Figures 3, 4:
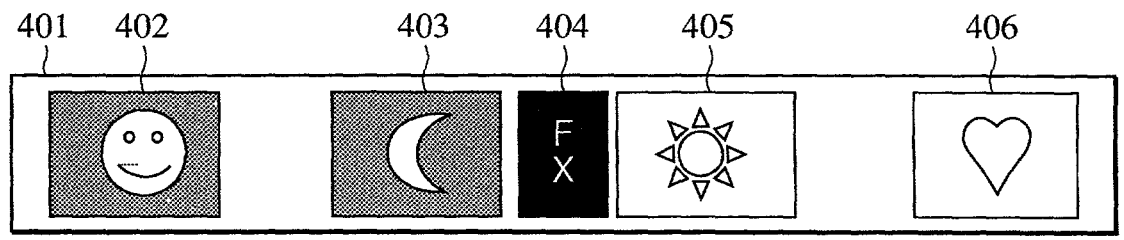
FIG. 3 is a view of example presentation-description data.
FIG. 4 is a view showing a storyboard display screen.

FIG. 3 shows an excerpt indicating a description of a moving-image object related to the present invention, from presentation-description data described by the use of an extended description language based on SMIL 2.0. In FIG. 3, description elements and syntax not related to the description of the present embodiment are omitted. An element which specifies a moving image in presentation-description data is hereinafter called a moving-image object, and a specified moving-image file is hereinafter called moving-image data.

Each line in FIG. 3 corresponds to a moving-image object, and mov1.mpg to mov5.mpg correspond to moving-image data.

In this example, mov1.mpg to mov5.mpg are sequentially played back, and mov3.mpg is modified moving-image data of only a portion where the wipe effect has been applied from the time one second before the end of mov2.mpg to the time one second after the start of mov4.mpg. The moving-image object in the third line of FIG. 3, which specifies mov3.mpg, is called a modified-data object in the present embodiment. As attribute information indicating that an object is a modified-data object, a description element of "rclipFor" is attached to the object. In this example, the attribute information "rclipFor" has a value of "transition," which indicates a video transition effect.

Figure 2:
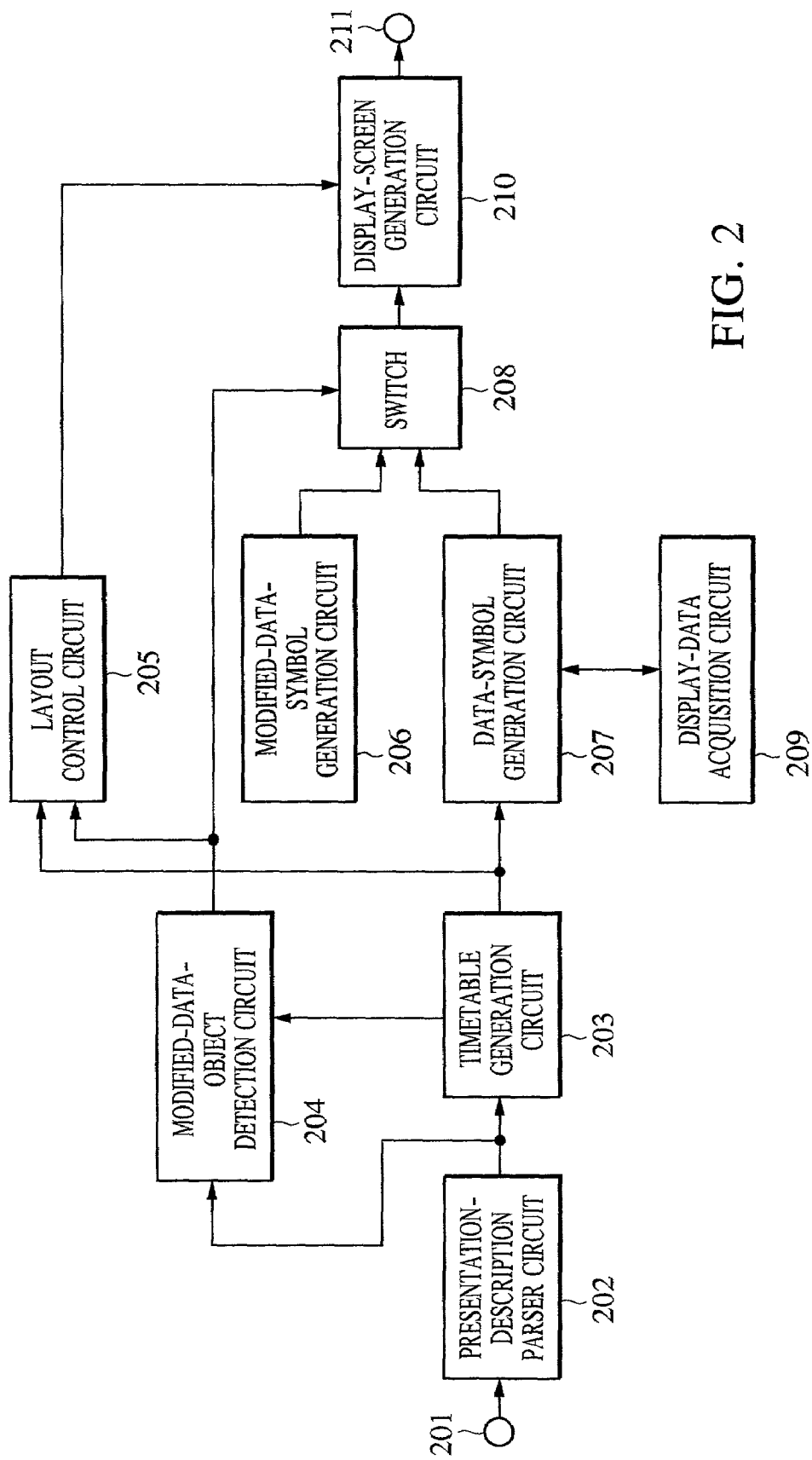
FIG. 2 is a block diagram of a display-screen generation section in the editing apparatus shown in FIG. 1.

FIG. 2 is a view showing the structure of circuits for generating a storyboard display screen according to presentation-description data in the display-screen generation section 109.

In FIG. 2, a presentation-description parser circuit 202 analyzes the syntax of presentation-description data input through a terminal 201, and extracts each moving-image object. A timetable generation circuit 203 generates a timetable for presenting the moving-image data specified by each moving-image object according to the presentation time of each moving-image object analyzed by the presentation-description parser circuit 202. The entries of the generated timetable are sequentially sent to a data-symbol generation circuit 207, and converted to symbol images indicating the entries in an editing screen display. A moving-image-data thumbnail is an example of symbol image. The data-symbol generation circuit 207 requests a display-data acquisition circuit 209 to send thumbnail data corresponding to the entries, if necessary. The thumbnail images of moving-image clips are stored in advance in the HDD 103 together with the moving-image data. The display-data acquisition circuit 209 outputs a control signal to the HDD 103, reads the thumbnail image corresponding to a requested moving-image data, and sends it to the data-symbol generation circuit 207.

A modified data-object detection circuit 204 checks each moving-image object analyzed by the presentation-description parser circuit 202 for a modified-data identification attribute to detect a modified-data object. A switch 208 is switched for each entry of the timetable generated by the timetable generation circuit 203 to send symbol-image data generated by the data-symbol generation circuit 207 to a display-screen generation circuit 210 for a usual moving-image object and to send modified-data symbol generated by a modified-data-symbol generation circuit 206 to the display-screen generation circuit 210 for a modified-data object.

The modified-data-symbol generation circuit 206 generates, for example, an image symbol indicating a video effect.

A layout control circuit 205 controls the display-screen generation circuit 210 so as to generate a display screen known as a storyboard in non-linear video editing, on which thumbnail images are arranged in a presentation order, from the timetable output from the timetable generation circuit 203. In response to instructions sent from the layout control circuit 205, the display-screen generation circuit 210 arranges the image symbols of the entries of the timetable, sent from the switch 208, generates data indicating a display screen, and outputs it to a terminal 211.

The layout control circuit 205 also arranges an image symbol indicating an effect between usual thumbnail display positions so as to clearly indicate the effect, according to the output of the modified-data-object detection circuit 204, for a modified-data object.

FIG. 4 is a view of a storyboard-type editing screen generated by the foregoing processing for the example presentation-description shown in FIG. 3.

In FIG. 4, the thumbnail images 402, 403, 405, and 406 of mov1.mpg, mov2.mpg, mov4.mpg, and mov5.mpg, respectively are shown in a storyboard display window 401. These are generated by the data-symbol generation circuit 207.

There is shown an image symbol 404 corresponding to the modified-data object which specifies mov3.mpg. Since the moving-image object on the third line in FIG. 3, which specifies mov3.mpg, is a modified-data object to which a modified-data identification attribute has been attached, the modified-data-object detection circuit 204 detects this modified-data object, and controls the switch 208 so as to output the image symbol indicating the modified-data object to the display-screen generation circuit 210. In response to the output of the modified-data-object detection circuit 204, the layout control circuit 205 places the image symbol 404 between the thumbnail images 403 and 405, which corresponds to usual moving-image objects, so as to clearly shows that the modified-data object indicates an effect, at the presentation timing of the modified-data object corresponding to the image symbol 404.

In this way, in the present embodiment, since, for modified data which expresses only a video effect, a symbol icon indicating the video effect, not a usual moving-image-data display, is displayed in an editing operation screen which is like a storyboard, the user can easily understand the position of the video-effect image.

The user checks the storyboard based on the presentation-description data. When the user wants to change the presentation order, the user specifies an editing mode on the operation input section 101. When an instruction for the editing mode is issued, the control section 102 activates an editing application. The display-screen generation section 109 generates an editing screen, and the screen is displayed on the display section 106. The user performs operations on the editing screen by the use of the operation input section 101 to apply edit processing to moving-image data and audio data stored in the HDD 103. The editing processing can be performed with a known structure. The modified-data processing section 110 generates modified data obtained by applying effect processing to image data.

When the editing processing is finished, the control section 102 controls the modified-data processing section 110 to generate presentation-description data according to the presentation order obtained by editing. When modified data is disposed in the presentation order, attribute information is added to the modified-data object in the presentation-description data, as shown in FIG. 3. The generated presentation-description data is stored in the HDD 103. The user can specify the storyboard display of the presentation-description data to display a storyboard screen based on the generated presentation-description data, on the display section 106 and to check the result of editing.

A second embodiment will be described next, in which a storyboard screen based on presentation-description data is shown differently. In the following embodiment, the same editing apparatus as that shown in FIG. 1 is used.

Figure 5:
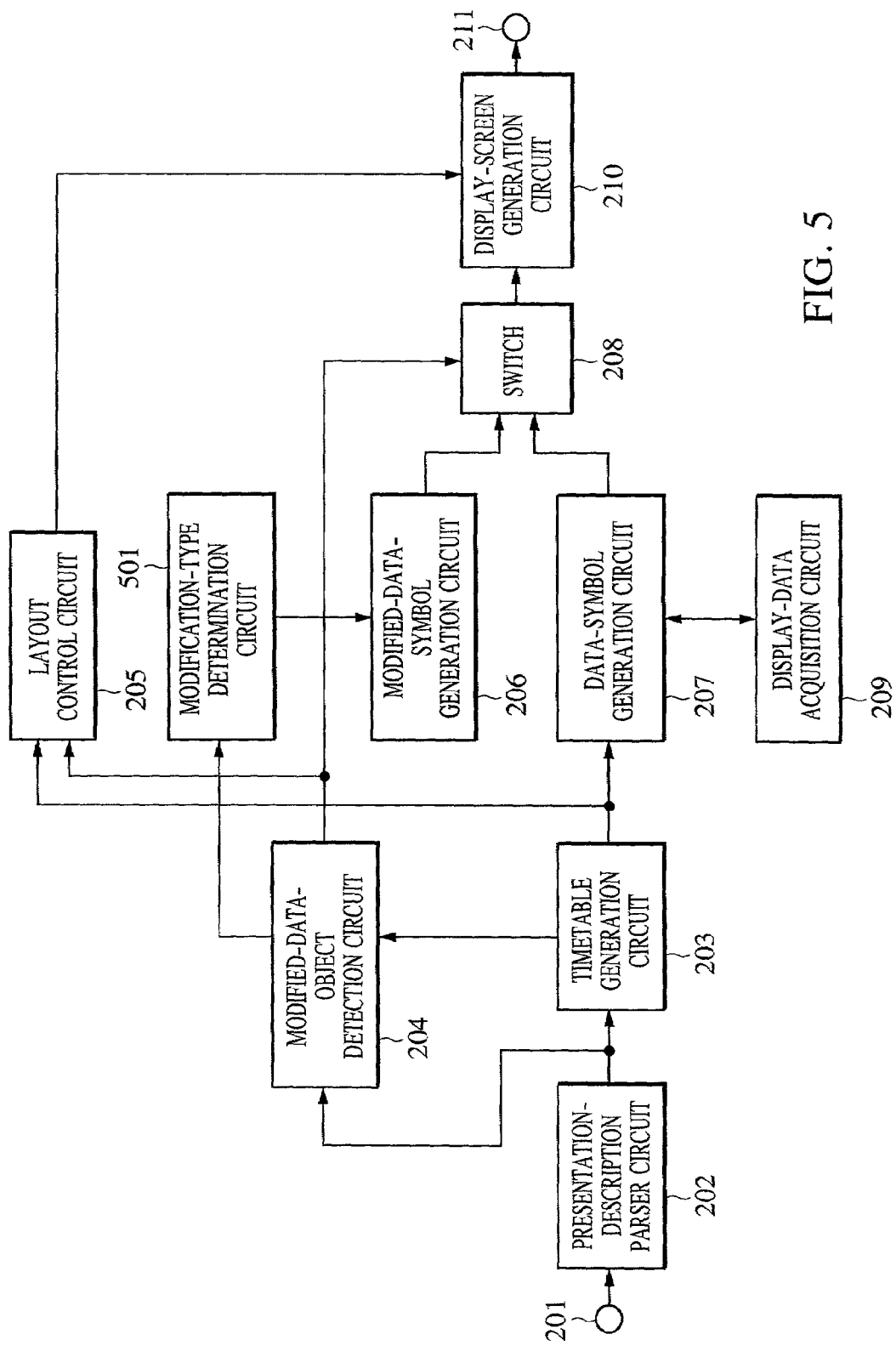
FIG. 5 is a block diagram of another display-screen generation section.

FIG. 5 is a view showing a main section of a display-screen generation section 109. The same numbers as those used in FIG. 2 are assigned to the same portions as those shown in FIG. 2.

In the same way as described above, presentation-description data to be edited is input to a terminal 201.

Figures 6, 7:
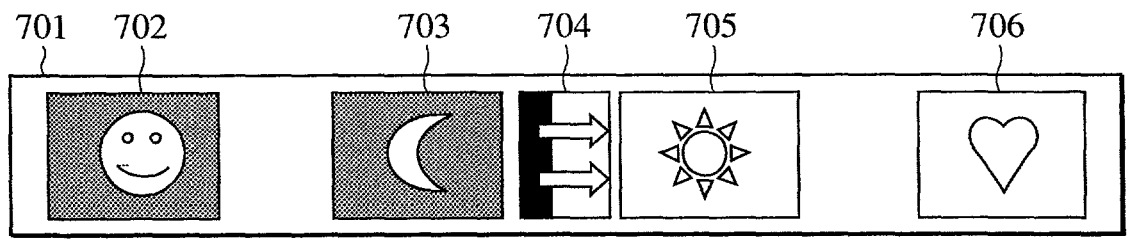
FIG. 6 is a view of another example presentation-description data.
FIG. 7 is a view showing another storyboard display screen.

FIG. 6 shows an excerpt indicating a description of a moving-image object related to the present embodiment, from presentation-description data described by the use of an extended description language based on SMIL 2.0. In the example shown in FIG. 6, mov1.mpg to mov5.mpg are sequentially played back, and mov3.mpg is modified moving-image data of only a portion where the wipe effect has been applied from the time one second before the end of mov2.mpg to the time one second after the start of mov4.mpg.

In the present embodiment, a description element of "rclipFor" is attached to an object on the third line in FIG. 6 as attribute information indicating that the object is a modified-data object. The value of the attribute information "rclipFor" is set to a modification type of "wipe_LR," which indicates a wipe effect from the left to the right on the screen. In the present embodiment, this video effect type determines a modified-data image symbol to be displayed on a storyboard.

In FIG. 5, a presentation-description parser circuit 202 analyzes the syntax of the input presentation-description data, and extracts each moving-image object. A timetable generation circuit 203 generates a timetable, as described earlier, and sequentially sends the entries of the generated timetable to a data-symbol generation circuit 207. The data-symbol generation circuit 207 generates thumbnail moving-image data as a symbol image expressing each entry on the editing screen.

A modified-data-object detection circuit 204 detects a modified-data object from each moving-image object analyzed by the presentation-description parser circuit 202, and switches a switch 208 for each entry of the timetable to send a symbol image generated by the data-symbol generation circuit 207 and a modified-data symbol image generated by a modified-data-symbol generation circuit 206 to a display-screen generation circuit 210.

A modification-type determination circuit 501 checks a modified-data object detected by the modified-data-object detection circuit 204 for the value of the modified-data-object identification attribute to determine its modification type, and sends a signal indicating the modification type to a modified-data-symbol generation circuit 206. The modified-data-symbol generation circuit 206 generates a symbol icon corresponding to the determined modification type, such as a symbol icon for the wipe effect for the case shown in FIG. 6.

A layout control circuit 205 controls the display-screen generation circuit 210 so as to generate a storyboard screen from the timetable output from the timetable generation circuit 203. In response to instructions sent from the layout control circuit 205, the display-screen generation circuit 210 arranges the image symbols of the entries of the timetable, sent from the switch 208, to generate editing-screen data, and outputs it to a terminal 211. An image symbol for a modified-data object is placed between usual thumbnail images so as to clearly indicate that the object corresponds to an effect.

FIG. 7 is a view of a storyboard-type editing screen generated by the foregoing processing for the example presentation-description shown in FIG. 6. The thumbnail images 702, 703, 705, and 706 of mov1.mpg, mov2.mpg, mov4.mpg, and mov5.mpg, respectively, are shown in a storyboard display window 701. These are generated by the data-symbol generation circuit 207.

The moving-image object specifying mov3.mpg on the third line in FIG. 6 is a modified-data object to which a modified-data identification attribute has been attached. For this modified-data object, a modified-data symbol 704 indicating a wipe effect from the left to the right on the screen, generated by the modified-data-symbol generation circuit 206, is displayed. In response to the output of the modified-data-object detection circuit 204, the layout control circuit 205 places the modified-data symbol image 704 between the usual thumbnail images 703 and 705 so as to clearly shows that the modified-data object indicates an effect.

In this way, in the present embodiment, for moving-image data which expresses only a video effect, a symbol icon with which even an effect content can be identified, not a usual moving-image-data display, is displayed in an editing operation screen which is like a storyboard.

Since an effect content is determined from the attribute information of a modified-data object, and a symbol image indicating the effect content is generated and displayed, the user can easily confirm the content of the modification applied to the modified data.

A third embodiment will be described next, in which a storyboard screen based on presentation-description data is shown further differently. In the following embodiment, the same editing apparatus as that shown in FIG. 1 is used.

Figure 8:
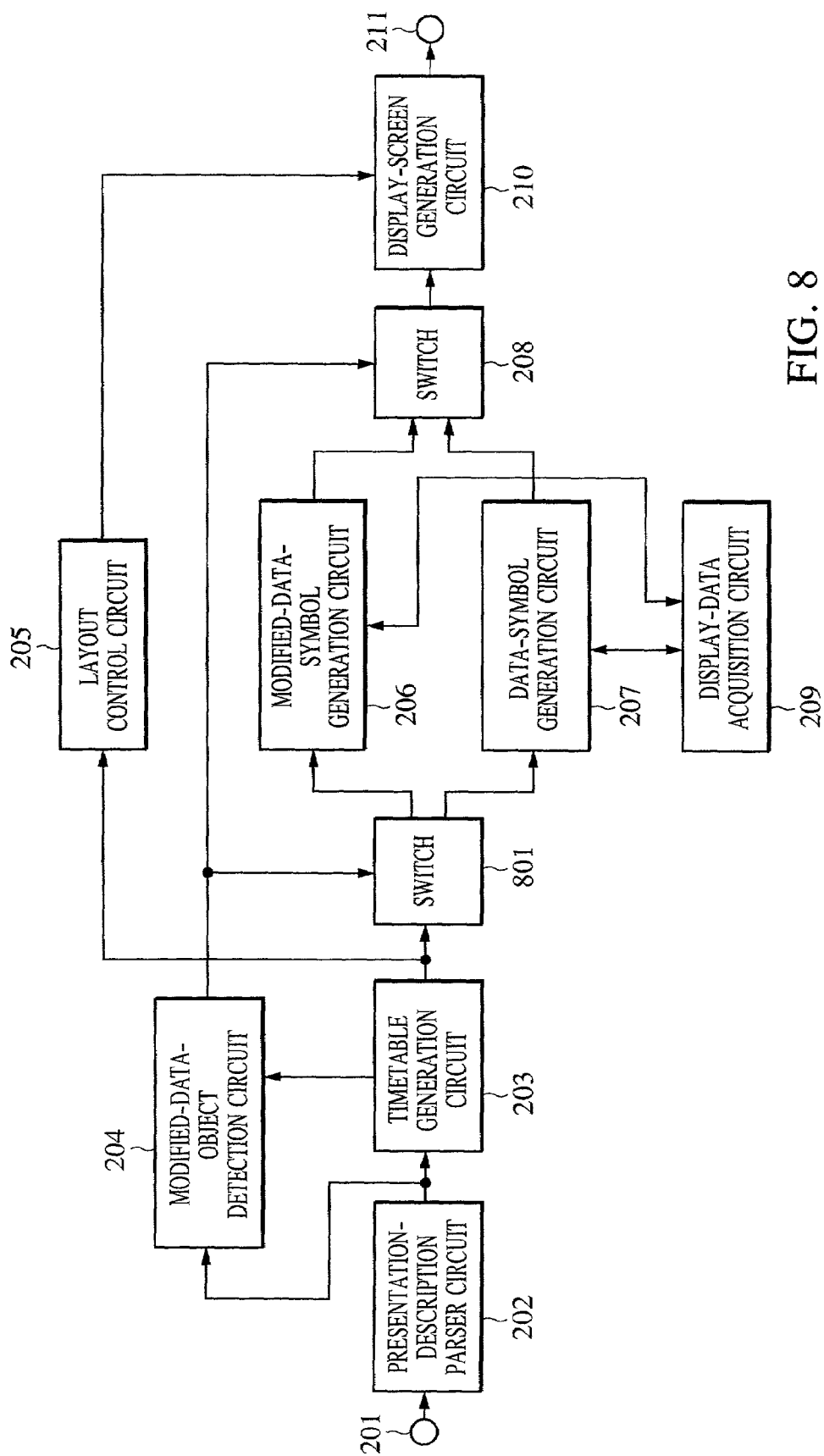
FIG. 8 is a block diagram of yet another display-screen generation section.

FIG. 8 is a view showing a main section of a display-screen generation section 109. The same numbers as those used in FIG. 2 and FIG. 5 are assigned to the same portions as those shown in FIG. 2 and FIG. 5.

In FIG. 8, presentation-description data to be edited is input to a terminal 201. A presentation-description parser circuit 202 analyzes the syntax of the input presentation-description data, such as that shown in FIG. 3 or FIG. 6, and extracts each moving-image object. A timetable generation circuit 203 generates a timetable for presenting the moving-image data specified by each moving-image object according to the presentation time of each moving-image object analyzed by the presentation-description parser circuit 202.

The entries of the generated timetable are sequentially sent through a switch 801 to a modified data-symbol generation circuit 206 or to a data-symbol generation circuit 207, and a symbol image expressing each entry on the editing screen is generated by the modified-data-symbol generation circuit 206 or by the data-symbol generation circuit 207.

A modified-data-object detection circuit 204 checks each moving-image object analyzed by the presentation-description parser circuit 202 for a modified-data identification attribute to detect a modified-data object. The modified-data-object detection circuit 204 controls the switch 801 such that, when an entry in the timetable is a modified-data object, the output of the timetable generation circuit 203 is sent to the modified-data-symbol generation circuit 206, and for other cases, the output of the timetable generation circuit 203 is sent to the data-symbol generation circuit 207.

The data-symbol generation circuit 207 generates thumbnail images expressing entries on the editing screen for usual data objects in the timetable.

The modified-data-symbol generation circuit 206 generates modified-data symbol images expressing entries on the editing screen for modified-data objects in the timetable, and sends them to the switch 208. In the present embodiment, a symbol icon indicating modified data is superposed on a thumbnail image for the modified data to generate a symbol image for the modified data.

To this end, the modified-data-symbol generation circuit 206 requests a display-data acquisition circuit 209 to send the thumbnail image data corresponding to an entry, if necessary. The display-data acquisition circuit 209 reads the thumbnail image data corresponding to the requested moving-image data from the HDD 103, and sends it to the modified-data-symbol generation circuit 206. The modified-data-symbol generation circuit 206 superposes a symbol icon indicating a video effect on the thumbnail image data to generate a modified-data symbol image.

A layout control circuit 205 controls the display-screen generation circuit 210 so as to generate an editing screen on which thumbnail images are arranged in a presentation order, from the timetable. In response to instructions sent from the layout control circuit 205, the display-screen generation circuit 210 arranges the symbol images of the entries of the timetable, sent from the switch 208, generates editing-screen data, and outputs it to a terminal 211.

Figure 9:
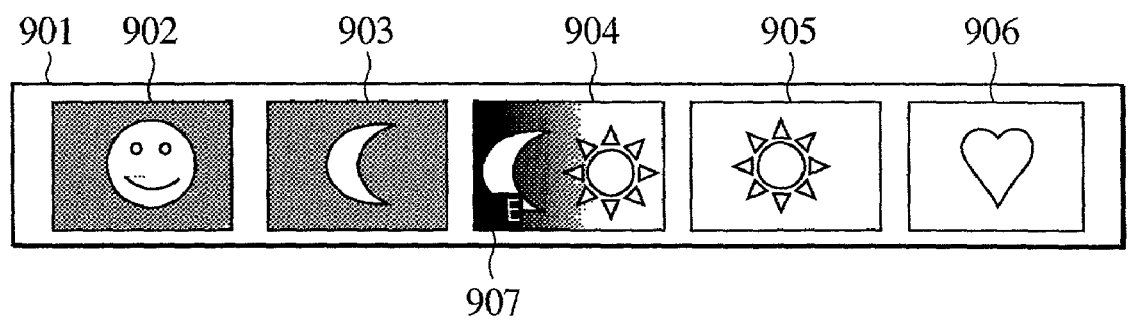
FIG. 9 is a view showing yet another storyboard display screen.

FIG. 9 is a view of a storyboard-type editing screen generated by the foregoing processing for the example presentation-description shown in FIG. 3. In FIG. 9, the thumbnail images 902, 903, 905, and 906 of mov1.mpg, mov2.mpg, mov4.mpg, and mov5.mpg, respectively, are shown in a storyboard display window 901. These are generated by the data-symbol generation circuit 207. For the modified-data object, a thumbnail image 904 in which a modified-data symbol 907 indicating a video effect, generated by the modified-data-symbol generation circuit 206, has been superposed is displayed.

In this way, in the present embodiment, since, for modified data which expresses only a video effect, a thumbnail image which includes a symbol icon indicating the video effect, not a usual moving-image-data display, is displayed in an editing operation screen which is like a storyboard, the user can easily recognize the modified data specified by the presentation-description data.

A fourth embodiment will be described next, in which a storyboard screen based on presentation-description data is shown still further differently. Also in the following embodiment, the same editing apparatus as that shown in FIG. 1 is used.

Figure 10:
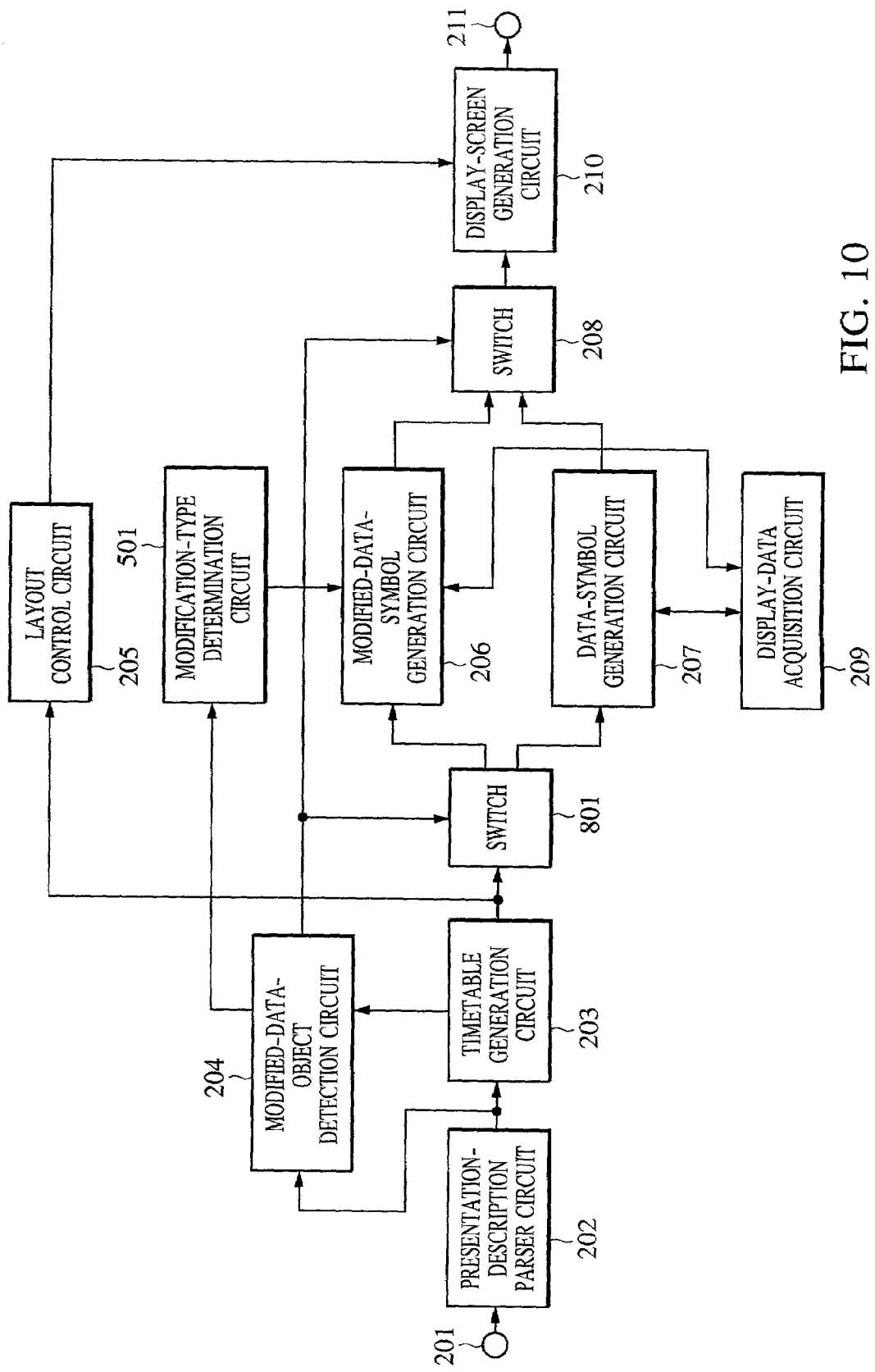
FIG. 10 is a block diagram of still another display-screen generation section.

FIG. 10 is a view showing a main section of a display-screen generation section 109. The same numbers as those used in FIG. 2, FIG. 5, and FIG. 8 are assigned to the same portions as those shown in FIG. 2, FIG. 5, and FIG. 8.

In FIG. 10, a presentation-description data to be edited is input to a terminal 201. A presentation-description parser circuit 202 analyzes the syntax of the input presentation-description data, and extracts each moving-image object. A timetable generation circuit 203 generates a timetable for presenting the moving-image data specified by each moving-image object according to the presentation time of each moving-image object analyzed by the presentation-description parser circuit 202.

The entries of the generated timetable are sequentially sent through a switch 801 to a modified-data-symbol generation circuit 206 or to a data-symbol generation circuit 207, and a symbol image expressing each entry on the editing screen is generated by the modified-data-symbol generation circuit 206 or by the data-symbol generation circuit 207.

A modified-data-object detection circuit 204 checks each moving-image object for a modified-data identification attribute to detect a modified-data object. The modified-data-object detection circuit 204 controls the switch 801 such that, when an entry in the timetable is a modified-data object, the output of the timetable generation circuit 203 is sent to the modified-data-symbol generation circuit 206, and for other cases, the output of the timetable generation circuit 203 is sent to the data-symbol generation circuit 207.

The data-symbol generation circuit 207 generates thumbnail images expressing entries on the editing screen for usual data objects in the timetable, and sends them to a display-screen generation circuit 210 through the switch 208.

The modified-data-symbol generation circuit 206 generates modified-data symbol images expressing entries on the editing screen for modified-data objects in the timetable, and sends them to the switch 208. In the present embodiment, a symbol icon indicating a video-effect type is superposed on a thumbnail image for moving-image data to generate a symbol image for a modified-data object.

To this end, the modified-data-symbol generation circuit 206 requests a display-data acquisition circuit 209 to send the thumbnail image data corresponding to an entry, if necessary. The display-data acquisition circuit 209 reads the thumbnail image data corresponding to the requested moving-image data from the HDD 103, and sends it to the modified-data-symbol generation circuit 206.

A modification-type determination circuit 501 checks a detected modified-image object for the value of a modified-data-object identification attribute to determine the type of the modification, and sends it to the modified-data-symbol generation circuit 206. The modified-data-symbol generation circuit 206 determines a modified-data symbol according to the determined video-effect type. In the presentation-description data shown in FIG. 6, for example, since the modification type of the modified-data object is "wipe," a symbol icon for the wipe effect is superposed on the thumbnail image data to generate a modified-data symbol.

A layout control circuit 205 controls the display-screen generation circuit 210 so as to generate an editing screen on which the thumbnail images of the entries are arranged in a presentation order, from the timetable. Under the control, the display-screen generation circuit 210 arranges the symbol images of the entries of the timetable, sent from the switch 208, to generate editing-screen data, and outputs it to a terminal 211.

Figure 11:
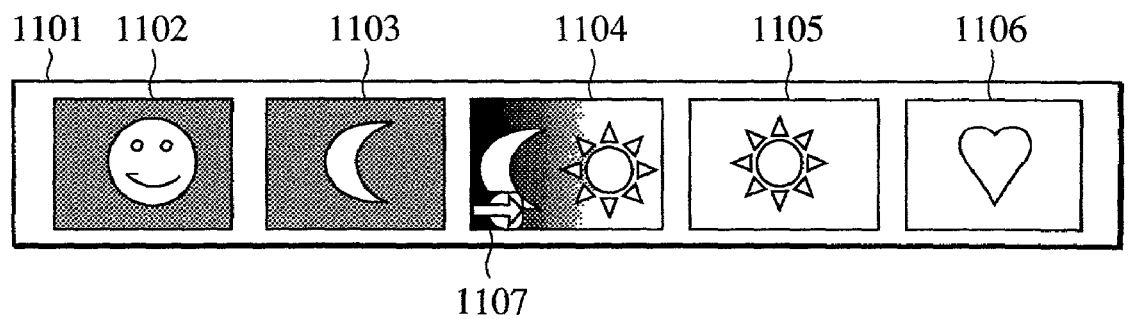
FIG. 11 is a view showing still another storyboard display screen.

FIG. 11 is a view of a storyboard-type editing screen generated by the foregoing processing for the example presentation-description shown in FIG. 6.

The thumbnail images 1102, 1103, 1105, and 1106 of mov1.mpg, mov2.mpg, mov4.mpg, and mov5.mpg, respectively, are shown in a storyboard display window 1101. For a modified-data object, a thumbnail image 1104 in which a modified-data symbol 1107 indicating a wipe effect from the left to the right on the screen, generated by the modified-data-symbol generation circuit 206, has been superposed is displayed.

In this way, in the present embodiment, for modified data which expresses only a video effect, a thumbnail image which includes a symbol icon with which even an effect content can be identified, not a usual moving-image-data display, is displayed in an editing operation screen which is like a storyboard. Therefore, the user can easily recognize modified data specified by presentation-description data, and the content of the modification applied to the modified data.

A fifth embodiment will be described next, in which a storyboard screen based on presentation-description data is shown yet further differently. Also in the following embodiment, the same editing apparatus as that shown in FIG. 1 is used.

Figure 12:
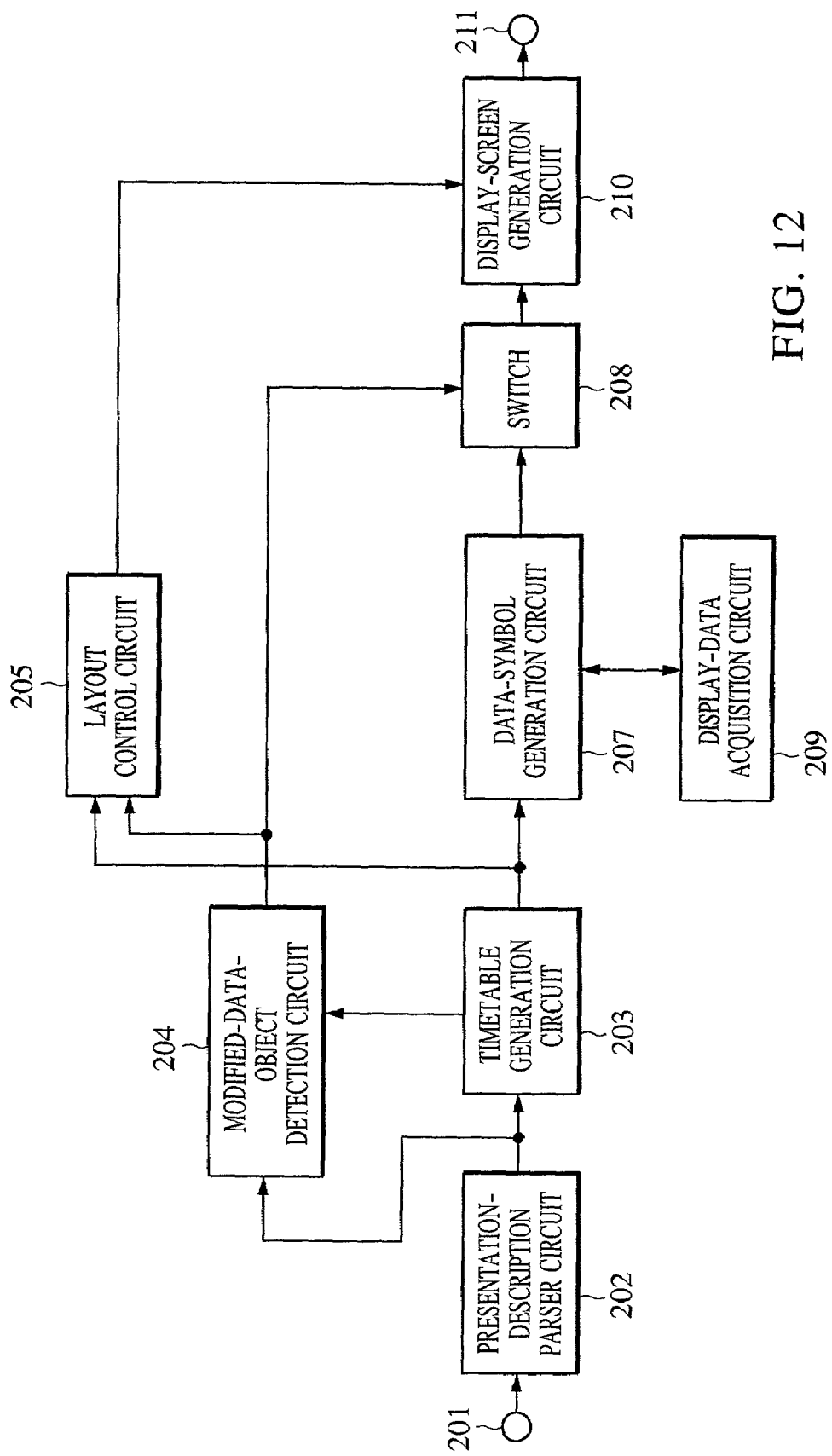
FIG. 12 is a block diagram of still yet another display-screen generation section.

FIG. 12 is a view showing a main section of a display-screen generation section 109. The same numbers as those used in FIG. 2 are assigned to the same portions as those shown in FIG. 2.

In FIG. 12, a presentation-description data to be edited is input to a terminal 201. A presentation-description parser circuit 202 analyzes the syntax of the input presentation-description data, and extracts each moving-image object. A timetable generation circuit 203 generates a timetable for presenting the moving-image data specified by each moving-image object according to the presentation time of each moving-image object analyzed by the presentation-description parser circuit 202. The entries of the generated timetable are sequentially sent to a data-symbol generation circuit 207.

The data-symbol generation circuit 207 generates thumbnail images expressing the entries of the timetable, and sends them to a display-screen generation circuit 210 through a switch 208.

A modified-data-object detection circuit 204 checks each moving-image object for a modified-data identification attribute to detect a modified-data object. On/off control is applied to the switch 208 for each entry of the timetable such that, for a usual moving-image object, a symbol image generated by the data-symbol generation circuit 207 is sent to the display-screen generation circuit 210, and for a modified-data object, a symbol image is not sent.

A layout control circuit 205 controls the display-screen generation circuit 210 so as to generate an editing screen on which thumbnail images are arranged in a presentation order, from the timetable. In response to instructions sent from the layout control circuit 205, the display-screen generation circuit 210 arranges the symbol images (thumbnail images) of the entries of the timetable, sent from the switch 208, generates editing-screen data, and outputs it to a terminal 211.

In the present embodiment, the layout control circuit 205 controls such that a thumbnail image is not displayed for a modified-data object and a space is eliminated.

FIG. 13 is a view of a storyboard-type editing screen generated by the foregoing processing for the example presentation description shown in FIG. 3. In FIG. 13, the thumbnail images 1302, 1303, 1305, and 1306 of mov1.mpg, mov2.mpg, mov4.mpg, and mov5.mpg, respectively, are shown in a storyboard display window 1301. The thumbnail image of a modified-data object is not displayed because the modified-data-object detection circuit 204 turns off the switch 208 so as to disable the output of the thumbnail image of the modified-data object, and the layout control circuit 205 controls such that a space between the thumbnail images 1303 and 1305 shown in FIG. 13 is removed.

According to the present embodiment, moving-image data expressing only a video effect is not displayed in the storyboard. Therefore, the user is prevented from erroneously taking a modified-data object for a usual moving-image object.

In the foregoing embodiments, SMIL is used as a presentation-description language. A presentation order may be controlled with other description languages, such as an extensible markup language (XML).

In the foregoing embodiments, image data and presentation-description data are stored in an HDD and processed. The present invention can also be applied to a case in which presentation-description data is stored in a medium corresponding to the external storage device shown in FIG. 1, such as an optical disk or a memory card, together with moving-image data and audio data, and processed.

In the foregoing embodiments, the wipe processing in the presentation-description data shown in FIG. 6 is taken as an example. It is also possible to apply other effect processing. In addition, a modification such as title synthesis can also be applied.

In the foregoing embodiments, the present invention is applied to the apparatus shown in FIG. 1. It is also possible that the same functions as those of the apparatus are implemented by a microcomputer and its peripheral units. In this case, the present invention includes equipment formed of the microcomputer and its peripheral units, and a memory which stores software for controlling the microcomputer.

As described above, according to the present invention, modified data can be easily recognized in a case in which information data is processed with the use of presentation-description data.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus for displaying a storyboard that lays out along one dimension a plurality of thumbnail images each of which represents a video clip, and for processing presentation-description data which designates a presentation order of a plurality of video clips including a video clip of an item of moving-image data and of a video clip of modified image data, different from the moving image data, obtained by modifying any of a plurality of items of the moving image data, comprising:

a symbol image generation unit configured to generate symbol image data different from thumbnail image data representing the video clip of the modified image data, for the video clip of the modified image data;

a detection unit configured to detect the video clip of the modified image data from the plurality of video clips designated by the presentation-description data according to the presentation-description data;

an editing-screen generation unit configured to generate editing-screen data for an editing screen displaying the storyboard that lays out the plurality of thumbnail images of the video clips in an order according to the presentation order designated by the presentation-description data, the editing-screen generation unit laying out, if the video clip of the modified image data is detected by the detection unit, a symbol image represented by the symbol image data of the video clip of the modified image data generated by the symbol image generation unit instead of the thumbnail image of the video clip of the modified image data in the storyboard; and a display control unit configured to display the editing screen based on the editing-screen data generated by said editing-screen generation unit, on a display device.

2. An image processing apparatus according to claim 1, wherein said symbol image generation unit detects a modification type assigned to the modified image data according to attribute information included in the presentation-description data, and generates the symbol image data for the video clip of the modified data indicating the detected modification type.

3. An image processing apparatus according to claim 2, wherein said symbol image generation unit generates a symbol icon indicating the modification type, wherein the modification type comprises a video effect.

4. An image processing apparatus according to claim 3, wherein said symbol image generation unit superimposes the symbol icon on a thumbnail image of the video clip of the modified image data, generating superposition image data, and outputs the generated superposition image data as the symbol image for the modified image data.

5. An image processing apparatus according to claim 1, wherein said symbol image generation unit generates a symbol icon indicating the modified image data, and outputs the symbol icon as the symbol image for the modified image data.

6. An image processing apparatus according to claim 1, wherein said symbol image generation unit superimposes an icon indicating the modified image data on a thumbnail image representing the modified image data, generating superposition image data, and outputs the generated superposition image data as the symbol image for the modified image data.

7. An image processing apparatus according to claim 1, wherein said editing-screen generation unit arranges the thumbnail images at positions corresponding to their presentation order.

8. An image processing apparatus according to claim 7, wherein the editing-screen generation unit detects the video clips of items of the moving-image data which are presented before and after the video clip of the modified image data according to the presentation-description data and places the symbol image of the video clip of the modified image data between the thumbnail image of the video clips of the moving-image data presented before and after the video clip of the modified image data in the storyboard.

9. An image processing apparatus according to claim 1, wherein the editing-screen generation unit includes an acquisition unit configured to acquire thumbnail image data of the video clips and generates the editing-screen data by using the thumbnail image data acquired by the acquisition unit.

10. An image processing apparatus according to claim 9, wherein the acquisition unit reads the thumbnail image data from a storage medium in which the moving-image data has been stored.

11. An image processing apparatus according to claim 1, wherein the moving-image data and the modified image data are recorded in a single recording medium.

12. An image processing apparatus according to claim 11, wherein the presentation-description data is recorded in the recording medium.

13. An image processing apparatus comprising:
a display apparatus that displays a storyboard that lays out along one dimension a plurality of thumbnail images each of which represents a video clip;
an apparatus that processes presentation-description data which designates the presentation order of a plurality of video clips including a video clip of an item of moving-image data and a video clip of modified image data, different from the moving-image data, obtained by modifying any of a plurality of items of the moving-image data,
wherein said display apparatus displays the storyboard that lays out the plurality of thumbnail images of the video clips in an order according to the presentation order designated by the presentation-description data, and
wherein when said image processing apparatus detects the video clip of the modified image data from the plurality of video clips designated by the presentation-description data, said display apparatus lays out a symbol image different from the thumbnail image representing the video clip of the modified image data instead of the thumbnail image of the video clip of the modified image data in the storyboard.

14. An image processing method for displaying a storyboard that lays out along one dimension a plurality of thumbnail images each of which represents a video clip, and for processing presentation-description data which designates a presentation order of a plurality of video clips including a video clip of an item of moving-image data and of a video clip of modified image data, different from the moving-image data, obtained by modifying any of a plurality of items of the moving-image data, comprising:
a symbol image generation step for generating symbol image data different from thumbnail image data representing the video clip of the modified image data, for the video clip of the modified image data;
a detection step of detecting the video clip of the modified image data from the plurality of video clips designated by the presentation-description data according to the presentation-description data;
an editing-screen generation step, of generating editing-screen data for an editing screen displaying the storyboard that lays out the plurality of thumbnail images of the video clips in an order according to the presentation order designated by the presentation-description data, the editing-screen generation step laying out, if the video clip of the modified image data is detected by the detection step, a symbol image represented by the symbol image data of the video clip of the modified image data generated by the symbol image generation step instead of the thumbnail image of the video clip of the modified image data in the storyboard; and
a display control step, of displaying the editing screen based on the editing-screen data, on a display device.

15. An image processing method for an image processing apparatus, comprising:
displaying a storyboard that lays out along one dimension a plurality of thumbnail images each of which represents a video clip; and
processing presentation-description data which designates the presentation order of a plurality of video clips including a video clip of an item of moving-image data and of a video clip of modified image data, different from the moving-image data, obtained by modifying any of a plurality of items of the moving-image data,
wherein said displaying step displays the storyboard that lays out the plurality of thumbnail images of the video clips in an order according to the presentation order designated by the presentation-description data, and
wherein when the image processing apparatus detects the video clip of the modified image data from the plurality of video clips designated by presentation-description data, the displaying step lays out a symbol image different from the thumbnail image representing the video clip of the modified image data instead of the thumbnail image of the video clip of the modified image data in the storyboard.

* * * * *